United States Patent [19]

Rosaia

[11] Patent Number: 4,507,032
[45] Date of Patent: Mar. 26, 1985

[54] RETRACTABLE TWISTLOCK FOR SECUREMENT OF A CONTAINER TO A SUPPORT

[75] Inventor: Albert H. Rosaia, Long Island City, N.Y.

[73] Assignee: Peck & Hale, Inc., Long Island City, N.Y.

[21] Appl. No.: 503,528

[22] Filed: Jun. 13, 1983

[51] Int. Cl.³ .............................................. B65J 1/22
[52] U.S. Cl. ...................................................... 410/83
[58] Field of Search .................................. 410/82, 83

[56] References Cited

U.S. PATENT DOCUMENTS

| | | | |
|---|---|---|---|
| 3,682,432 | 8/1972 | Lapaich | 410/83 |
| 3,752,511 | 8/1973 | Racy | 410/82 |
| 3,894,494 | 7/1975 | Erith et al. | 410/83 |
| 3,972,425 | 8/1976 | DiMartino | 410/77 |
| 3,989,294 | 11/1976 | Carr | 410/82 |
| 4,212,251 | 7/1980 | DiMartino | 410/98 |
| 4,419,034 | 12/1983 | DiMartino | 410/82 |

FOREIGN PATENT DOCUMENTS

| | | |
|---|---|---|
| 1144154 | 3/1969 | United Kingdom . |
| 1151381 | 5/1969 | United Kingdom . |
| 1174403 | 12/1969 | United Kingdom . |
| 1189426 | 4/1970 | United Kingdom . |
| 1306804 | 2/1973 | United Kingdom . |
| 1306805 | 2/1973 | United Kingdom . |
| 1420591 | 2/1976 | United Kingdom . |
| 1523863 | 6/1978 | United Kingdom . |

*Primary Examiner*—Robert R. Song
*Attorney, Agent, or Firm*—Pennie & Edmonds

[57] ABSTRACT

A twistlock for mounting and securing a container to a support including a socket and a plurality of operative components movable relative to the socket. The socket is supported within an opening of the support to locate an entry to a cavity within the socket at an upper surface. The operative components include a series of stacked members that are movable in concert in an extended position, and movable rotationally in a concert of movement or independently of one another. In this manner the members may be elevated, then positioned for receipt of the container, and, finally, one of the members may be moved to "lock" the container in position over the twistlock. There are stops for limiting movement longitudinally and rotationally and structure to permit independent movement of members rotationally.

26 Claims, 13 Drawing Figures

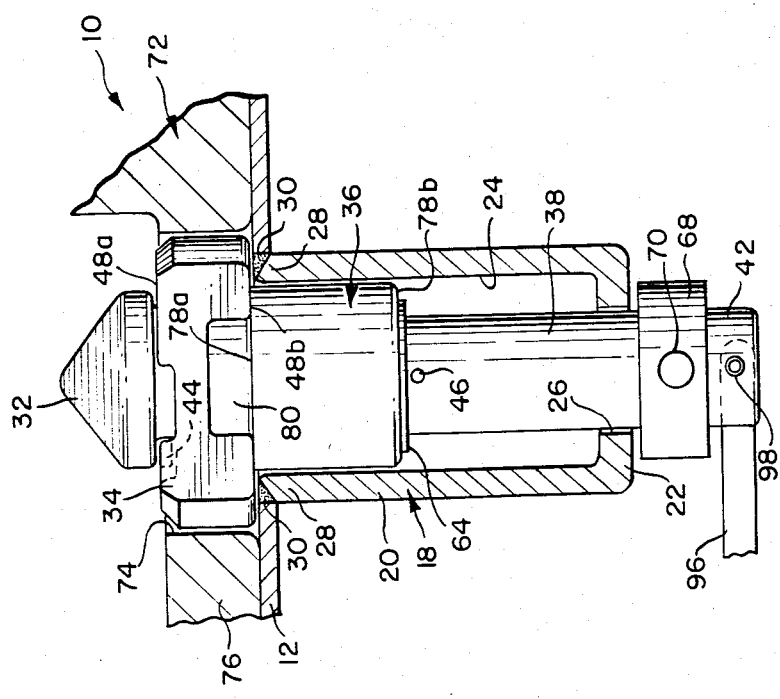
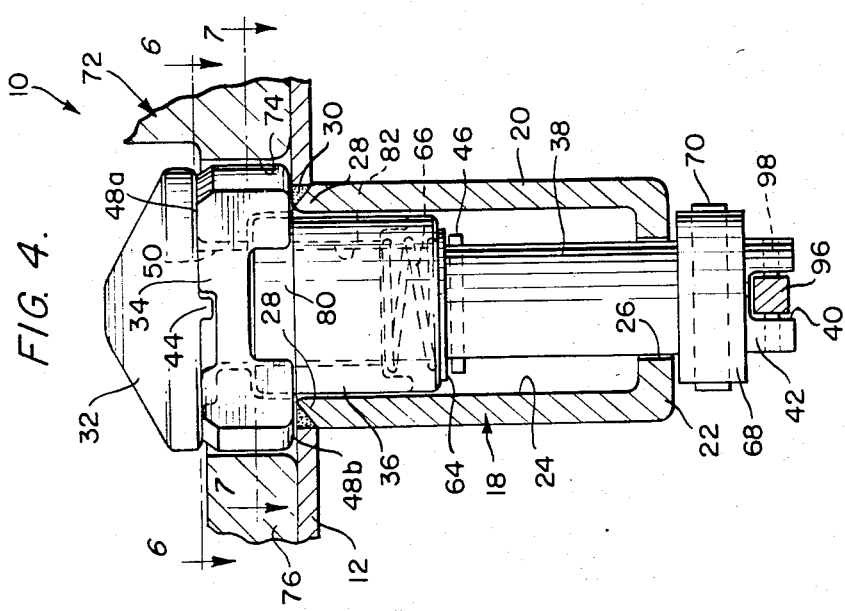

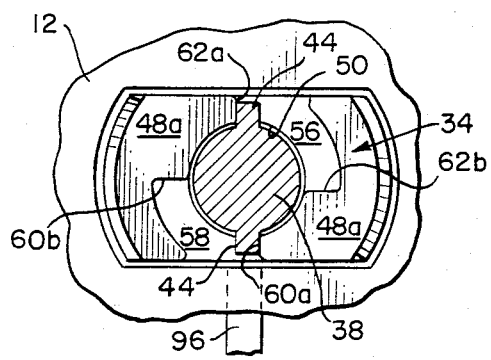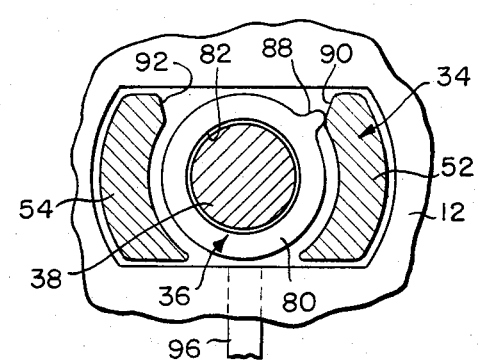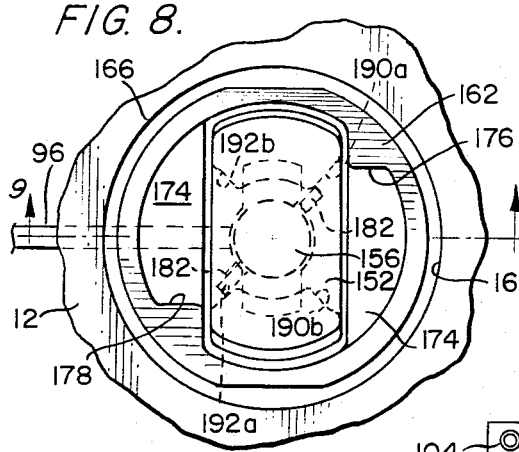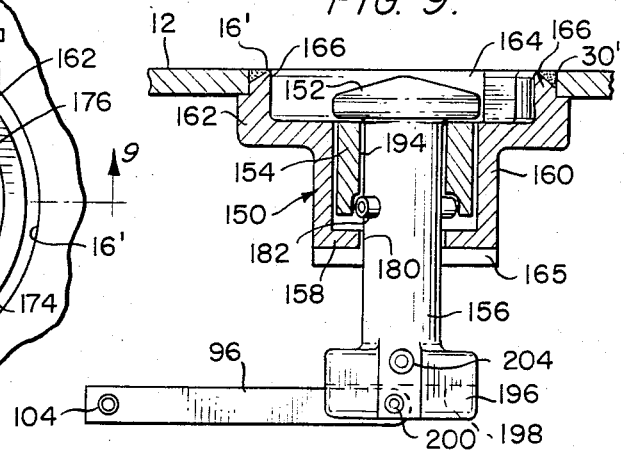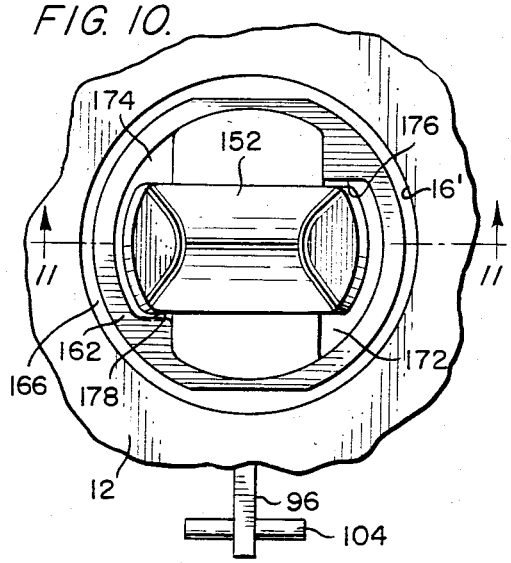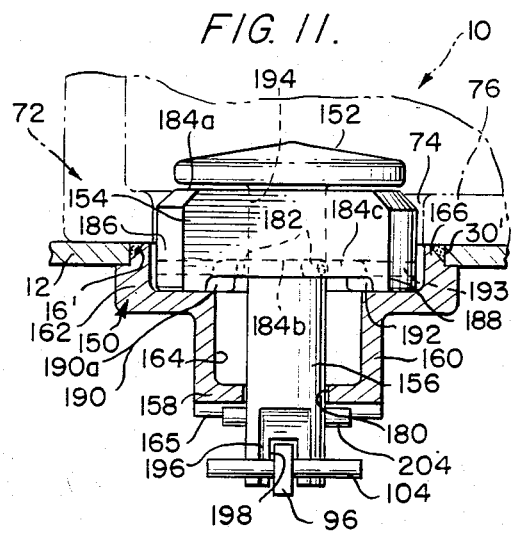

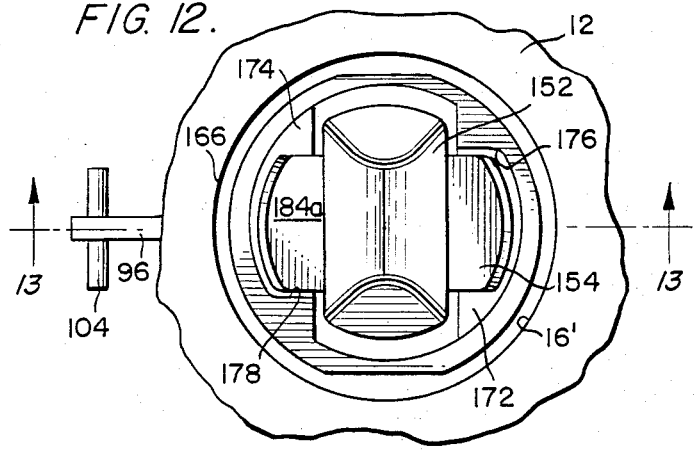
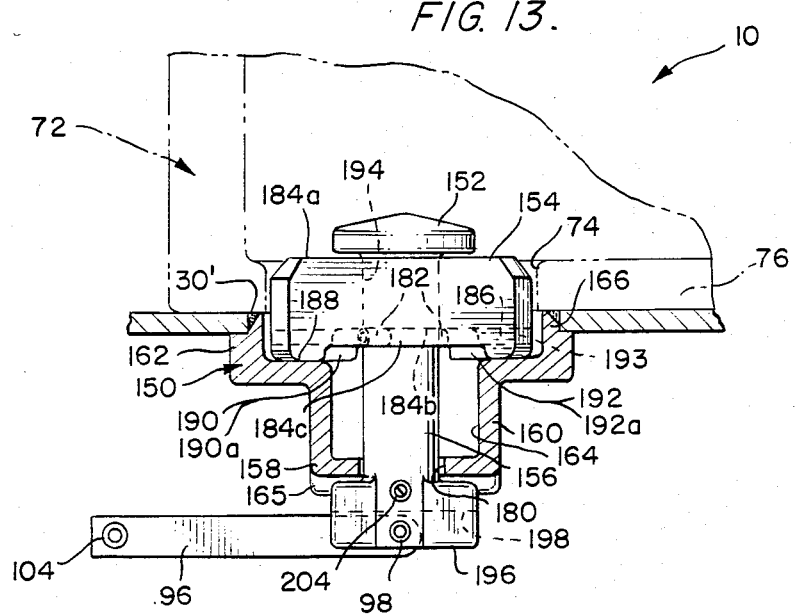

RETRACTABLE TWISTLOCK FOR SECUREMENT OF A CONTAINER TO A SUPPORT

DESCRIPTION

1. Technical Field

The invention relates to a twistlock for support and securement of a container on a surface. The twistlock includes a plurality of operative components movable in one direction from a retracted position to an extended position. Then, certain of the relocated components are rotated to a loading position for receipt thereover of the container, and, finally, the uppermost of the operative components is rotated to a securing position for immobilizing the container on the surface.

2. Background of the Invention

Mechanisms for support and securement of a container on a support surface are known to the prior art. Typical of these mechanisms are those described in U.S. Pat. Nos. 3,752,511 to Stanley Racy, 3,972,425 to John M. DiMartino and 4,212,251 which also issued to John M. DiMartino. The Racy patent and the second of the two DiMartino patents are somewhat similar in that they both describe a pair of operative components that are normally positioned in a loading position to receive thereover a fitting at a corner of the container. These patents, moreover, describe that the operative components are supported in a fixed extending position, and that the operative component furtherest removed from the fixed support is capable of angular displacement from the loading position to a securing position at which the operative component which shall have been angularly displaced spans the web surrounding an opening in the fitting. The other operative component fills the opening and the two operative components provide support and securement of the container in both the horizontal and longitudinal directions.

The first of the two DiMartino patents is somewhat different in overall construction in that it relates to a static structure for receipt of a container.

British Patent Specification No. 1,151,381 to Michael Ellis describes an anchorage unit for securing a container to a flatbed of a vehicle. The anchorage unit is in the form of a T-head spindle carried in a box-like casing. The T-head spindle is described as having capability of movement through an angle of rotation. More particularly, Ellis describes that a plurality of anchorage units are positioned and fastened to the frame of the vehicle so that each T-head spindle registers with, and passes through, an opening in a fitting at a corner of the container. Each T-head spindle is controlled by a hand lever to rotate the same so that the T-head will bridge the web surrounding the opening in the fitting.

British Patent Specification Nos. 1,174,403 to Eric John Wilson et al and 1,189,426 to Alan Henry Briggs et al both describe an operation somewhat similar to the description in Ellis specification. British Patent Specification Nos. 1,306,804, 1,306,805 and 1,420,591, each to Edward Clifford Cole, and British Patent Specification No. 1,523,863 to William Brian Ness all describe retractable retaining devices. The Ness patent is considered representative of the specifications describing a retractable retaining device. According to Ness, the retractable retaining device, disposed in a housing, includes a spindle, a T-head supported at an end of the spindle, and a guide member carried along the spindle. The housing is carried below a plate upon which a container may be located, and the retractable retaining device is capable of movement relative to the housing to an extended position to locate the guide member within an opening in a web of a fitting of the container, and the T-head within the fitting itself. The spindle may be rotated to rotate the T-head to a position that it spans the web around the opening. The Ness structure, when it is extended, somewhat duplicates the Racy structure previously described.

The twistlock of the invention, including the forms to be described, differs substantially from the prior art, as described by Ness. To this end, the twistlock of the invention relates to operative components which are movable from a retracted position to an extended position, then, through an intercooperation of structure two of the operative components which are extended are rotated conjointly with a rod from a first to a loading position. Finally, the uppermost of the operative components, again, is rotated conjointly with the rod from the loading position to a securing position. The second conjoint movement is in the direction opposite to the direction of the first conjoint movement, and independently of the other component theretofore rotated. Thus, the intercooperating structures, in addition to the conjoint movement capability, provide structure for limiting movement toward the loading position and for providing movement of the rod and the uppermost of the operative components independently of the other operative component in the location of operative components in the securing position. This type of operation, and the intercooperating structures are not disclosed in the prior art.

SUMMARY OF THE INVENTION

The invention relates to a twistlock having a capability, among possible others, of mounting and securing a container to a support surface (hereafter referred to as a "deck"). The container to be mounted and secured is of a standardized construction. This will be briefly described in the description of the preferred embodiments.

The twistlock, forms of which will be described, includes a socket and a plurality of operative components received in the socket while in a retracted position. The operative components are movable from the retracted to an extended position at which at least some of the operative components may be rotated in one direction from a first to a second or loading position. The loading position of the operative components is the position required for receipt thereover of a fitting at a corner of the container. In the loading position, a first and second member of the operative components will enter an opening into the interior of the fitting.

The first and second members are of similar outline in plan view and the outline is substantially coextensive to that of an opening of the socket leading to a cavity and the opening of the fitting of the container, as well. The first member, the leading member, enters fully into the interior of the fitting when the container is located to the deck, and the second member locates within the opening in the fitting. The first member, in position within the interior of the fitting, and not prevented by the web around the opening in the fitting in return movement to the first position, then, is rotated relative to the second member. The final rotational positions of the first and second members, therefore, will act to secure the mounted container against movement in directions both parallel and perpendicular to the support surface.

The socket is mounted within an opening in the deck thereby to position the opening leading to the cavity at an upper surface of the deck. Two preferred forms of socket and operative components are disclosed.

In a first form, the socket includes a cavity of a size which generally conforms to the opening in the deck. The operative components, in addition to the first and second members, include a rod which mounts the first member at an end, and carries the second member along its length. A handle is mounted at the other end of the rod for purposes of manipulation of the operative components from the retracted to the extended position, then, through movement rotationally to position the first and second members in the loading position and, finally, to position the first member in the container securing position.

The operative components also include a third member carried along the rod in a position below the second member. The second and third members interact to limit movement of the second member rotationally from the first to the second position (or loading position) to less than a full revolution. Actually, the movement is limited to about 90°.

The second and third members carried along the rod are supported axially thereby to move to the extended position and remain in the extended position until returned, with the rod to the retracted position. More particularly, the third member is supported by the rod and the second member is supported by the third member. A lug extending from the rod interacts with the second member to impart to that member a direct following movement as the rod is rotated from the first to the second position (or loading position). The second member includes a recess for permitting lost motion between the lug and second member as the rod and first member are rotated in the opposite direction to return to the first position for securement of the container.

A spring may be included for support of the second and third members, and for ease and greater smoothness in movement of members, rotationally.

A second form of twistlock includes only the first and second of the three members thereby to provide a low profile construction. In this form, the socket is of somewhat different construction to provide a cavity and a rim at the opening to the cavity. The rim interacts with the second member in limiting movement rotationally as the first and second members are rotated to the second position (or loading position).

In both of these forms of twistlock, more particularly described below, there is a unique interaction of operative components to position those components longitudinally from a retracted position within a socket to an extended position, and rotationally, first, to a position for loading a container and, second, to a position for securing the container.

DESCRIPTION OF THE DRAWING

FIG. 4 is a vertical elevation, partly in section, of the twistlock of FIG. 3 in an extended (or loading) position;

FIG. 5 is a vertical elevation, partly in section, of the twistlock of FIG. 3 in an extended and securing position;

FIG. 6 is a view as seen along the line 6—6 in FIG. 4;

FIG. 7 is a view as seen along the line 7—7 in FIG. 4;

FIG. 8 is a view in section of a second form of twistlock as seen along the line 8—8 in FIG. 1;

FIG. 9 is a view as seen along the line 9—9 of FIG. 8;

FIG. 10 is a plan view, similar to FIG. 8, of the twistlock in an extended (or loading) position;

FIG. 11 is a view as seen along the line 11—11 in FIG. 10;

FIG. 12 is a plan view, similar to FIG. 10, of the twistlock in the extended and securing position; and FIG. 13 is a view as seen along the line 13—13 in FIG. 12.

BRIEF DESCRIPTION OF THE PREFERRED EMBODIMENTS

The twistlock of the invention may be used to secure a container 10 to a supporting surface (hereafter referred to generally as a deck). The container which is to be secured to the deck may comprise an intermodal piece of transport equipment constructed according to an industry and world-wide standardization scheme, a scheme which is more particularly described in the literature, such as "International Standard ISO 1161", Series 1 Freight Containers—Corner Fittings—Specification, 1st Edition 1976-07-15, among other publications.

Two forms of twistlock will be described. The forms of twistlock include the form illustrated in FIGS. 2-7 and the form illustrated in FIGS. 8-13.

In the form of twistlock of FIGS. 2-7, the container is secured to the deck by first locating the operative structure of the twistlock to an extended position from a retracted (or stored) position. Then, certain of the component parts of the operative structure are rotated in one direction from a first to a second (or loading) position for receipt thereover of a fitting located at a corner of the container. Finally, the uppermost component part, a part which shall have entered into the interior of the fitting, is rotated in the opposite direction, independently of other component parts, to span the web surrounding the opening through which the uppermost component part previously entered.

The form of twistlock of FIGS. 8-13 requires a similar manipulation of operative structure from the retracted (or stored) position to the extended position, and then, in rotation from a first to a second (or loading) position for receipt thereover of the corner fitting of the container. At this time, the uppermost component part which shall have entered into the interior of the fitting is rotated in the opposite direction to span the web surrounding the opening in the corner fitting. The distinction in this form of twistlock resides in the reduced number of component parts which comprise the operative components. As such, the twistlock of FIGS. 8-13 provides a profile of a height reduced from that of the form of twistlock of FIGS. 2-7.

Figure 1:
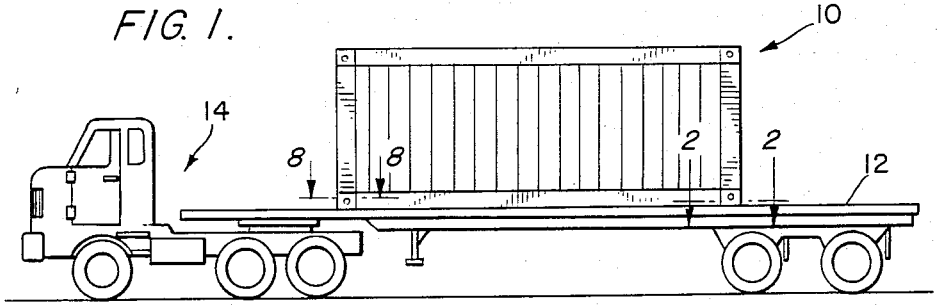
FIG. 1 is a side elevation of a trailer truck and a container secured to the flatbed.

By virtue of the basic concept of standardization of containers, it is possible to load a container at a plant, warehouse, or other location and move the container by truck, rail, ship or any combination of these conveyances to an ultimate destination at which the container may be unloaded. The standardization contemplates a standardization of container in size and construction of corner fitting to permit handling and securement of a container to other containers or to a deck 12. In the description to follow, see FIG. 1, the deck may be considered to be the flatbed of a trailer 14.

Figure 2:
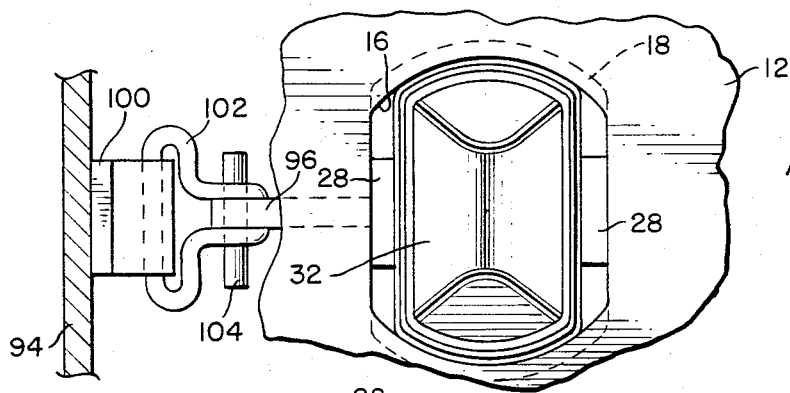
FIG. 2 is a broken away view along the lines 2—2 of FIG. 1.

Referring to FIG. 2, an array or several arrays of openings 16 (only one is shown) are formed in deck 12 throughout its extended length. The openings in the deck are spaced apart in one or more rectangular arrangements determined by the size of container and the number of containers, in end-to-end arrangement. Features of the container other than that it supports a corner fitting for engagement of operative components of the twistlock within an opening, as well as across the web surrounding the opening, are outside the scope of the invention.

A socket 18 is mounted on the underside of deck 12. The socket is substantially rectangular in configuration including opposite ends (the ends along the minor dimension) which are rounded outwardly. The socket is formed by a plurality of walls 20 which extend from a base 22 toward an entry at an upper rim to a cavity 24. An opening 26 is formed in the base 22. The opening may be of any outline to accommodate a rod and both movement (longitudinal movement) and rotation of the rod relative to the socket during manipulation of the operative structure. The opening, however, is of a size so that the base provides a surface for support of the component parts when they are in the retracted position.

The opening 16 in deck 12 may be somewhat shorter in its major dimension than the opening leading to cavity 24. This may be seen in FIG. 2. Thus, the upper rim defining the opening into the cavity of the socket, as shown in the dotted line, extends beyond the end of opening 16.

Figure 3:
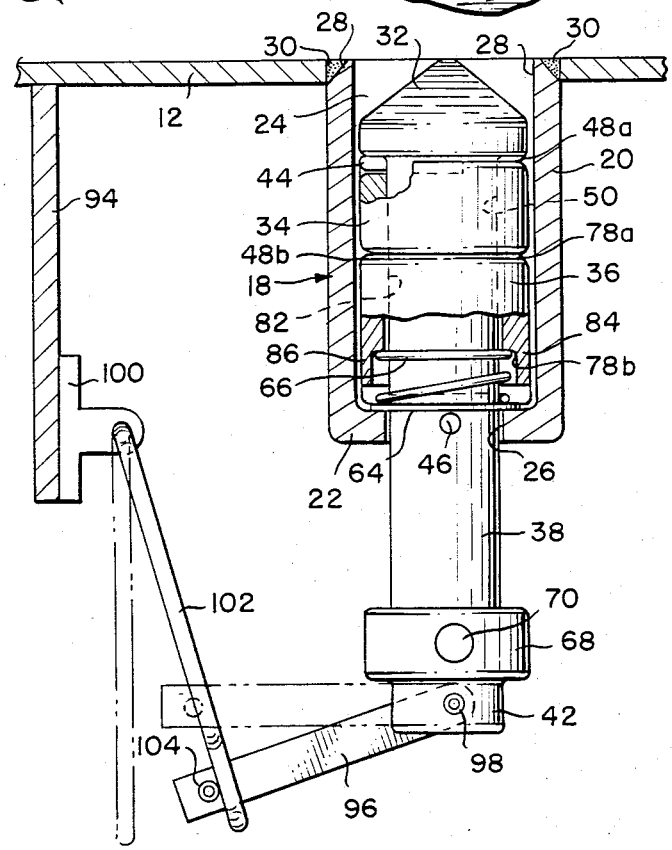
FIG. 3 is a vertical elevation, partly in section, of a first form of the twistlock in a retracted (or stored) position.

A lip 28 extends upwardly from the upper rim of the socket. Actually, a pair of lips extend from the mid region, along the major dimension of the upper rim. In mounting the socket, the extending portions of the walls, along their minor dimension, are disposed flush against the undersurface of deck 12 so that the lips enter into opening 16. The socket may be welded or otherwise secured to the underside of the deck in the disposition described above. A welding bead 30 is illustrated in FIG. 3.

The cavity 24 provides a housing for the operative structure of the twistlock to be manipulated in the securement of a container on deck 12. The operative structure includes cone 32, trunk 34 and trunk 36. Trunk 34 provides a locating capability (for locating the corner fitting of container 10), and trunk 36 provides the capability of centering the operative structure relative to socket 18. A rod 38 extends through each trunk and mounts the cone at one end. The rod is of a length substantially longer than the height of the walls 20 of socket 18 thereby to pass through the opening 26 in base 22. A channel 40 is formed at the other end of the rod. The channel is formed along a diameter through the rod and defined by a pair of shoulders 42.

The structure for securing container 10 to deck 12 will now be discussed in greater detail.

The trunks 34, 36 each comprise a body of a size (in plan view) substantially coextensive with that of cavity 24 for freedom of movement in the longitudinal direction between the extended and retracted positions. The trunks, however, when viewed in elevation, are somewhat different in configuration, see FIGS. 3-5, and the trunks are somewhat different when viewed in section, see FIGS. 6 and 7. These differences provide for the operation of twistlock in mounting a container.

Referring to FIG. 3, a pair of lugs 44 are illustrated as extending radially outward, along a diameter of rod 38. The lugs extend from the rod at the junction between the rod and cone 32, and serve the function of imparting rotational movement to trunk 34, which moves in concert with the cone, in locating the cone and trunk to the loading position.

A pin 46 which may be a roll pin extends through rod 38. The pin is located in a disposition along rod 38 removed from lugs 44. The pin, together with structure to be described below, supports both trunks 34, 36 on the rod and prevents displacement longitudinally of the trunks along the rod.

Referring to FIG. 6, trunk 34 includes a main body with an upper surface 48a (the direction of the Figures), bevelled somewhat around its entire perimeter. An opening 50 is formed through the body of trunk 34 from the upper surface to a lower surface 48b. The opening is of a size to conform generally to the size of opening 26. In addition, trunk 34 includes a pair of legs 52, 54 (see FIG. 7) which extend from the lower surface 48b. The legs are formed along the outwardly rounded (the minor dimension) ends of the trunk. Each leg, further, extends along a short length of one side of the long dimension. As illustrated, the legs are symmetrical about the minor axis of trunk 34, but not the major axis of the trunk. The purpose for this construction is to provide a pair of stops to limit angular movement of trunk 34 relative to trunk 36 and provide for a socket connection of the two trunks. This will be discussed below.

Referring again to FIG. 6, a pair of regions 56, 58 are formed as cut outs in the upper surface 48a on opposite sides of opening 50. The regions extend around substantially a full 90° arc of the opening (from a 0° reference point to 90°, and from 180° to 270°, as seen in plan) to form a track for movement of lugs 44. The walls that delimit the regions define stops including a first pair of stops 60a, 62a and a second pair of stops 60b, 62b. The stops of each pair of stops are at an angular displacement of 90° one from the other. The pairs of stops are located along perpendicular axes, actually along the major and minor axes, through the longitudinal axis of opening 50 (see FIG. 6). The regions, as may be appreciated by both description and illustration, are of like size and symmetrical about a plane through the axis of opening 50.

The lugs 44 are free to move rotationally through 90° rotation within the confines of the body of trunk 34. The lugs follow rotation of rod 38 for movement between stops 60a, 60b and stops 62a, 62b. In the retracted position of the operative structure (see FIG. 3) the lugs locate at the stops 60a, 62a. The trunk 34 and cone 32, when the operative structure is extended, then may be located in the FIG. 4 or loading position at which lugs 44 continue to locate at stops 60a, 62a. When cone 32 is rotated relative to trunk 34 to the FIG. 5 or securing position the lugs will relocate at stops 60b, 62b.

Considering the operation to this point, initially cone 32, trunk 34 and trunk 36 are located within the confines of the cavity 24 of socket 18 (see FIG. 3). Prior to locating container 10 on the deck, the cone and both trunks are moved longitudinally to the extended position. More particularly, the rod is imparted movement longitudinally, and the cone and both trunks follow that movement through action of pin 46, a plate or washer 64 received around rod 38 and supported by the pin and a spring 66 which is supported by the washer. The spring may be a compression spring and functions to maintain pressure between the operative components including cone 32, trunk 34 and trunk 36. While the spring is not a necessary component of the twistlock in carrying out its operation, it has been found that the spring provides a smoother operating manipulation of structure.

The seating of the other end of the spring will be discussed below.

Movement of the operative components, longitudinally to the extended position, is limited by a sleeve 68 providing a stop when the sleeve moves into contact with the undersurface of base 22. A pin supports the sleeve on rod 38. The pin may be a roll pin. The position of the operative components at this point of the overall securement process is not shown, but the position may be readily appreciated from FIG. 3.

FIG. 4 illustrates the position of cone 32 and trunks 34, 36 after rod 38 is rotated in one direction (counterclockwise in the Figure) from the first to the second (or loading) position. In this position, trunk 34 and cone 32 are located at an angle of 90° relative to the major axis of trunk 36. The position of trunk 34 and cone 32 permits receipt thereover of a fitting 72 located at a corner of container 10.

When the container is situated in the FIG. 4 position, the rod 38 is rotated, once again, although in the clockwise direction, to rotate cone 32 to FIG. 5 position. In the FIG. 5 position, the trunk 34 is disposed within an opening 74 of web 76 of the fitting, and cone 32 is positioned to span the inner surface of the web adjacent the opening. In this movement the lugs 44 follow the track provided by regions 56, 58 in the movement discussed above.

The trunk 36 provides a centering function in the longitudinal movement of the operative structure between the extended and retracted positions. The trunk, working in concert with trunk 34, also functions as a stop in locating trunk 34 in either the FIGS. 3 or 4 positions.

Trunk 36 includes a main body with an upper surface 78a (the upper surface toward trunk 34). A collar 80 (see FIG. 7) extends from the upper surface surrounding an opening 82. The collar serves to extend the length of opening 82 to provide support for rod 38 along an increased axial length. In addition, the collar assists in guiding movement of trunk 34 rotationally. A pair of legs 84, 86 (see FIG. 3) extend from the lower surface 78b of the body toward base 22 of socket 18, and a finger 88 extends radially outward from the collar.

While the trunk 36 is immobilized within the cavity 24 of socket 18, the upper surface 78a of the trunk interacts with the lower surface 48b of trunk 34. More particularly, the collar extending from surface 78a interacts within an opening or race provided by legs 52, 54. As illustrated, see FIG. 7, legs 52, 54 each include (toward opening 82) an inner arcuate surface substantially concentric with the outer surface of collar 80. Thus, trunk 34 is permitted freedom of movement rotationally relative to trunk 36. Legs 52, 54 provide a pair of stops 90, 92, respectively, each removed by an equiangular distance from the zero reference position heretofore discussed. The stops are spaced to allow movement of trunk 34 through a 90° turn relative to trunk 36. This movement is limited by finger 88 which will locate to stop 92 in the retracted and the extended, non-loading position of the operative structure, and then, to stop 90 when trunk 34 and cone 32 are located in the loading position.

Legs 84, 86 of trunk 36 substantially enclose a seat into which the end of spring 66, the end removed from the end supported by the washer, is received. As previously set out, washer 64 which is supported by the pin 46, below the washer, maintains the spring in a state of compression.

While the showing of FIG. 3, namely the elevation of the operative components above the base 22, is somewhat exaggerated the spring does provide a measure of buoyancy to the operative components. Springs displaying various spring forces may be used, as desired.

The outer diameter of washer 64 is chosen to act against the inner surface of base 22 around opening 28. The washer, therefore, will limit movement of the operative components when moved to the retracted position. Movement of the operative structure to the extended position is limited by sleeve 68.

Referring to FIGS. 2-5, socket 18 is supported on the undersurface of deck 12 in a position that the major axis through the socket is along a plane parallel to the plane of a skirt 94 extending from the deck. A handle is supported within channel 40. The handle is provided to manipulate rod 38, cone 32 and both trunks 34, 36, to the extended position, and for rotating the rod, cone and trunk 34 through those angular displacements, as heretofore discussed. The handle is in the form of a bar of extended length. The handle may have a rectangular cross section. Whatever the cross section of the handle, however, one end is rounded to accommodate pivotal movement of the handle within channel 40. A pin 98 may be used to mount the handle. As may be appreciated (see FIG. 3) the pin, which may be a roll pin, extends through the longitudinal axis of rod 38 so that the handle, in essence, forms an extension of the rod when in the hanging position. A similar handle is provided for manipulating the operative structure of the form of twistlock of FIGS. 8-13.

In FIG. 3, the handle is illustrated in a position secured to skirt 94. The operative structure, when in the extended, rotated position, may be secured in the same manner. A bracket 100 is supported by the skirt and a clip 102 is supported by the bracket. The clip and handle are engageable to releasably lock the operative structure in the positions heretofore described. A releasable, locking engagement is provided by a pin 104 carried at the other end of the handle.

In operation, the handle 96 is released from the FIG. 3 position. The handle, in the hanging position, then, is imparted movement upward (relative to socket 18). Rod 38 follows this movement to a limit position at which sleeve 68 moves into contact with the lower surface of base 22. The sleeve is of a dimension to prevent any possibility of over travel of the rod relative to the socket 18 when the rod is moved from the retracted to the extended position. The handle of the form of twistlock of FIGS. 8-13 may be similarly secured and released.

FIG. 4 illustrates the position of rod 38 and the operative structure supported by pin 46, washer 64 and spring 66 after a full longitudinal traverse to the extended position, and rotation of the rod and cone counterclockwise through an angle of 90°. Trunk 34 follows the rotational movement by action of lugs 44 against stops 60a and 62a. Rotation is limited to rotation through 90° by finger 88 which, first, engages with stop 92 when operative components are in the retracted and in the extended, non-loading positions and, second, with stop 90 when the operative components are in the extended, loading position (see FIG. 7).

FIG. 5 illustrates the position of rod 38 and cone 32 following rotation of the rod in the opposite direction through the same angle of rotation as first mentioned. In this movement, lugs 44 move from the stops 60a, 62a along the tracks above regions 56, 58 and within the arcuate walls 50a, to a position of contact with stops 62b, 60b, respectively. Trunk 34, disposed within the opening 74 of fitting 72 is immobilized.

In the return of the structure to a retracted position within the socket 18 the various movements of the operative structure, both rotationally and longitudinally, are reversed. Thus, cone 32 and rod 38 are rotated from the FIG. 5 to the FIG. 4 position to once again locate lugs 44 at stops 60a, 62a. This movement is a counterclockwise movement and places the cone in the loading position. At this time container 10 is lifted away from the twistlock. The rod, then, is rotated in the opposite direction. Trunk 34 which no longer is immobilized tends to follow movement of both the cone and rod, and ultimately moves to a position to enter into the socket. A slight return movement of the rod and cone may be required for entry of the cone into the socket if the cone has moved beyond the entry position.

Spring 66 assists in overcoming any possible jamming in these movements of operative structure when handle 96 is rotated. In the form of twistlock of FIGS. 3–7 the design of trunks 34, 36 is such that trunk 34 bears on collar 80 of trunk 36. The form of trunk permits rotation of cone 32 if the container 10 applies a horizontal load on trunk 34. In a form of twistlock without a spring, this action of container may result in a binding of structures.

The twistlock of the form illustrated in FIGS. 8–13 is characterized by low profile construction. A twistlock of low profile may be required in locations, such as the location of the fifth wheel carried by trailer 14. The twistlock is mounted on the underside of deck 12 in the location of section 8—8, see FIG. 1. The manner of mounting generally follows the discussion relating to the mounting of socket 18 so that the upper rim of the socket is substantially flush with the upper surface of the deck.

The twistlock includes a socket 150 and operative components including cone 152, trunk 154 and rod 156.

Socket 150 (see, for example FIGS. 8, 9) is formed by a base 158, a plurality of walls 160 extending from the base, and a rim portion 162. The rim provides an opening into a cavity 164 of the socket. The socket as defined by the base and walls corresponds generally in its exterior appearance to socket 18. The socket 150, however, differs from socket 18 in its overall appearance.

One difference resides the outline of the rim portion which is of a generally circular outline, see FIGS. 8, 10 and 12, as contrasted with the generally rectangular outline of the rim portion of socket 18. The openings 16' in deck 12 to which socket 150 is mounted are of circular outline, also. A second difference resides in the reduction in height of walls 160 to reduce the overall side profile of the socket. The reason for reducing the height is discussed above. A further difference resides in the base of the socket which includes a channel 165. The channel extends across the base between walls 160 comprising the long, parallel walls of the socket.

A lip 166 extends from an upper flat surface of the rim portion, as seen in FIG. 9, for example. In mounting the socket, lip 166 is received into opening 16' in the deck as the flat surface is moved into juxtaposition with its undersurface. The socket, then, may be welded or otherwise secured in place. A welding bead 30' is illustrated in the Figures.

A pair of surfaces 172, 174 are located within the rim portion 162. The surfaces are formed within the same plane, opposite one another across the cavity, and comprise the areas radially outward of the lines of intersection of the long, parallel walls 160. The surfaces, further, comprise those portions of a circle formed by a pair of secants of equal length. A stop 176 is located at one end of surface 172, and a second stop 178 is located at one end of surface 174. The stops are disposed at diametrically opposed locations.

An opening 180 is provided in base 158. The opening may conform to the outline of opening 26 in base 22 of socket 18. To this end, the opening may be round, or of a cruciform shape having the long dimension across the width of channel 165. If the opening is of the latter shape, it may be required to round the walls of the channel somewhat at mid-length to conform to the rounded ends of opening 180. This is not shown.

Cone 152 and rod 156 comprise a unitized assemblage of the operative components, and trunk 154 is received on the rod for movement relative to both the cone and rod. The movement of the trunk relative to the cone and rod will be one of rotation, since the trunk, as supported on the rod, is substantially immobilized by the cone in the supported position. A pin 182 received through rod 156 provides the support function. The pin may be a roll pin.

The cone duplicates substantially the form of cone 32, and the rod duplicates substantially the form of rod 38, both of the form of twistlock of FIGS. 2–7. The rod, however, is somewhat shorter in length.

Trunk 154, however differs both in outline and in operation from the construction of trunk heretofore discussed. To this end, the trunk may be considered somewhat simplified in overall outline including a main body conforming in exterior dimension to that of cavity 164 within the confines of walls 160. A surface 184a of the body (the upper surface facing cone 152) is flat, although bevelled somewhat around the outer perimeter, and the lower surface 184b includes a pair of legs 186, 188 defining a pair of raised walls 190, 192 respectively. The lower surface 184b extends to the location of pin 182 when the legs 186, 188 are supported on surface 172, 174 respectively (the loading position of trunk 154). The body also includes a pair of skirts 184c extending below the lower surface 184b. The skirts extend on both sides of the body along the major axis, and provide an extension of the side surfaces in the direction of legs 186, 188. The body rests on pin 182 and the inner walls of both the legs and skirts which are disposed around the pin provide a substantially enclosed track for relative movement of pin and trunk. The substantially enclosed track protects the pin so that it will not be damaged.

An opening 193 is formed through the legs 186, 188. The opening is formed along the major axis of trunk 154, coaxial with the opening through rod 156. The opening provides an entry way for receipt of the pin through the rod.

An opening 194 is formed along the axis of the body. The opening may be of an outline like that of opening 180 in base 168. The various openings 180, and so forth, are of the same size to permit the assembly of the twistlock.

Finally, a shoulder 196 is formed at the end of rod 156, opposite cone 152. The shoulder comprises a pair of extensions formed on a diameter, and a channel 198 extends through the shoulders and rod. A pin 200 may be used to mount the handle 96 within the channel for purposes of manipulative movement of the operative structure to be discussed below. The pin for mounting the handle may be a roll pin.

In operation of the twistlock, the operative components are moved longitudinally from the retracted position (see FIG. 8) to an elevated position, and then from a first to a second position (see FIG. 10), which is a loading position. Thus, the operative components initially are in alignment within the portion of cavity 164 of socket 150, bounded substantially by walls 160. Then, following the longitudinal movement to the extended position the operative components are rotated conjointly (counterclockwise in the Figures) to a position supported on surfaces 172, 174.

A pin 204 which extends through rod 156 limits movement of the operative components in the extended position.

When the operative components have been moved to the extended position by handle 96, the handle, then is located to a position within a channel 198 for purposes of rotating rod 156. In this rotation, pin 182 acts against a first pair of stops 190a, 192a formed at the ends of walls 190, 192 respectively, whereby legs 186, 188 move on to the surfaces 172, 174. Movement continues until the legs move into position against stops 176, 178 located at the ends of surfaces 172, 174, respectively. This is the loading position of FIGS. 10, 11. The twistlock, then, permits receipt thereover of a fitting 72 located at a corner of container 10. As illustrated in FIGS. 10, 11 trunk 154 is disposed within the opening 74 and cone 152 has entered into the confines of the fitting. At this point of the operation, see FIGS. 12, 13 the cone is rotated clockwise to position it at an angle of 90° to the trunk. Rotation of the cone is limited by action of pin against stops 190b, 192b (see FIG. 8) formed at the opposite ends of walls 190, 192, respectively. FIGS. 12, 13 illustrate the securing position of the operative components. In this position cone 152 will act on the inner surface of fitting 72, across the opening 74.

Movement of the operative structure of the low profile twistlock to the retracted position will follow a series of manipulation the reverse of those required to position that structure in the securing position. Also, the operative components may be locked either in the retracted or extended, securing position. The manner of locking the structure will follow that heretofore described in connection with handle 96 and securement by clip 102 and pin 104.

I claim:

1. A twistlock for mounting and securing a container to a support including a socket mounted within an opening of said support in a position that an entry to a cavity in said socket locates at an upper surface of said support, and a plurality of operative components adapted for longitudinal movement to an elevated position from a retracted position within said cavity, said plurality of operative components including at least a first member, a second member, a rod supporting said first member in fixed relation at one end, and means carried by said rod for supporting said second member in a stacked position juxtaposed to said first member, a handle mounted at the other end of said rod exteriorly of said socket adapted for manipulating said operative components longitudinally relative to said socket, beyond said entry, to said elevated position and, then, for rotating said rod in one direction from a first to a second position to locate said first and second members angularly relative to their position within said socket for receipt thereover of a fitting at a corner of said container whereby said first member enters through an opening into the interior of said fitting, and finally in an opposite direction to return said rod to said first position, said operative components further including a lug extending radially from said rod in position for coupling said second member and rod, a recess formed in a surface of said second member into which said lug extends whereby said second member follows directly the rotation of said rod in one direction, only, and means for limiting rotation of said rod in said one direction to less than a full rotation.

2. The twistlock of claim 1 wherein said first and second members are coextensive in outline and also substantially coextensive in outline to the outline of both said cavity and fitting opening, and when said container is received over said first and second members said first and second members function in securing said container against movement in directions both parallel and perpendicular to said support.

3. The twistlock of claim 1 wherein said support means includes a third member, a collar carried by a facing surface of one of said second and third members to extend toward the other of the two surfaces, and a recess formed in said other of the two surfaces, said recess acting as a track for movement of said collar and said second member relative to said third member when said rod is rotated in said one direction.

4. The twistlock of claim 3 wherein said third member, when said operative components are moved to said elevated position, is located at least partially within said cavity in a rotation confined position, and wherein said means for limiting rotation of said rod includes a finger and a stop within said recess, said finger extending from said collar, said rotation of said rod being limited by interaction of said recess top and finger.

5. The twistlock of claim 4 wherein said collar is carried by a facing surface of said third member.

6. The twistlock of claim 1 wherein said lug extends radially from said rod in position between said first and second members, said recess being formed in the surface of said second member facing said first member, said recess providing a path for independent movement of said lug when said rod is rotated in said opposite direction from said second to said first position.

7. The twistlock of claim 6 including a second lug extending from said rod in a direction opposite from said first lug, and a second recess formed in said surface of said second member opposite from said first recess, said recesses including a first pair of stops against which said lugs are positioned when said rod is rotated in said one direction from said first to said second position, and a second pair of stops spaced from said first pair of stops locating the position of said lugs when said rod is rotated independent of said second member in said opposite direction to return said rod to said first position.

8. The twistlock of claim 7 wherein said first and second pairs of stops are spaced apart by a rotational angle of about 90°.

9. The twistlock of claim 1 wherein said support means includes a third member of an outline coextensive in outline to the outline of said first and second members, a spring, and a ring carried in fixed position along said rod below said third member, said spring acting between said ring and a lower surface of said third member.

10. The twistlock of claim 9 wherein said lower surface of said third member includes a circular seat, and said spring comprises an helical compression spring supported within said circular seat for exerting a force on said members in said longitudinal direction.

11. The twistlock of claim 1 including motion limiting means carried on said rod in fixed position thereby to move with said rod into engagement with said socket for limiting movement of said operative components from the retracted position.

12. A twistlock for mounting and securing a container to a support including a socket mounted within an opening of said support in a position that an entry to a cavity in said socket locates at an upper surface of said support, and a plurality of operative components adapted for longitudinal movement to an elevated position from a retracted position within said cavity, said plurality of operative components including at least a first member, a second member, a rod supporting said first member in fixed relation at one end, and means carried by said rod for supporting said second member in a stacked position juxtaposed to said first member, a handle mounted at the other end of said rod exteriorly of said socket adapted for manipulating said operative components longitudinally relative to said socket, beyond said entry, to said elevated position and, then, for rotating said rod in one direction from a first to a second position to locate said first and second members angularly relative to their position within said socket for receipt thereover of a fitting at a corner of said container whereby said first member enters through an opening into the interior of said fitting, and finally in an opposite direction to return said rod to said first position, said support means also coupling said second member and rod whereby said second member follows directly the rotation of said rod in said one direction, only, said second member including a skirt extending axially of said rod thereby to substantially enclose said support means for protection and means for limiting rotation of said rod in said one direction to less than a full rotation.

13. The twistlock of claim 12 wherein said first and second members each include a body which is substantially coextensive in outline to one another, said socket cavity and said opening through said fitting at said corner of said container.

14. The twistlock of claim 13 wherein the facing surfaces of said first and second members are relatively flat, and wherein said second member includes an opening through said body to accommodate said rod.

15. The twistlock of claim 14 wherein said second member includes a recess in the other surface, at least one pair of stops formed by spaced walls of said recess, and wherein said support means comprises a lug member extending radially outwardly of said rod, said lug member being located within said recess, normally against one of said stops, to urge conjoint movement of said second member with said rod in movement rotationally in said one direction, and movable independently along said recess to said other stop when said rod is rotated in said opposite direction.

16. The twistlock of claim 15 including a second lug member extending radially from said rod in a direction opposite from said first lug member, and a second recess in the other surface to accommodate said second lug member, said second recess, further, including a second pair of stops likewise formed by spaced walls, said second lug member being located within said second recess, normally against one of said second stops for assisting in urging conjoint movement of said second member with said rod in movement rotationally in said one direction, and likewise movable along said second recess independently of said second member to said other of said second stops when said rod is rotated in said other direction.

17. The twistlock of claim 12 including a rim, said rim surrounding said entry to said cavity and forming a surface for support of said second member when said second member is rotated in said one direction to said second position.

18. The twistlock of claim 17 wherein said rim surface includes a flat region located on opposite sides of said cavity, said second member including a leg extending from opposite ends of the body surface opposite the surface facing said first member, each leg forming a first and second stop, each flat region terminating in a wall forming a stop and including an entry to said flat region, and wherein said support means is formed by a member for acting against a first stop of each leg to rotate each leg of said second member conjointly with said rod whereby each leg moves on to said flat region, and wherein conjoint movement of said rod and second member from said first to said second position continues until limited by said walls.

19. The twistlock of claim 18 including motion limiting means carried on said rod in fixed position thereby movable into engagement with said socket for limiting movement of said operative components from the retracted position.

20. The twistlock of claim 17 wherein said operative components include a third member, said third member being coextensive in size to each of said first and second members, means mounting said third member on said rod for movement with said first and second member to said elevated position.

21. The twistlock of claim 20 wherein said limiting means includes a lug extending from a surface of one of said second and third members toward the surface of the other member and a recess terminating at a wall in the other surface, whereby when said support means following rotation of said second member in said one direction said lug will move into a position of engagement against said wall to stop said rotation at said second position.

22. The twistlock of claim 21 wherein said lug extends from a lower surface of said second member.

23. The twistlock of claim 22 including a second lug and a second recess terminating at a second wall whereby each lug will move into a position of engagement against a wall to stop said rotation at said second position.

24. The twistlock of claim 17 including motion limiting means carried on said rod in fixed position thereby to move with said rod into engagement with said socket for limiting movement of said operative components from the retracted position.

25. The combination of a deck and a twistlock for securing a container received on said deck for support, said deck including an opening and twistlock including a socket, said socket having an upper rim providing an entry opening to a cavity, said socket being mounted in said deck opening in a position that said upper rim of said socket locates at an upper surface of said deck and a plurality of operative components adapted for longitudinal movement to an elevated position from a retracted position within said cavity, said plurality of operative components including at least a first member, a second member, a rod supporting said first member in fixed relation at one end, and means carried by said rod for supporting said second member in a stacked position juxtaposed to said first member, a handle mounted at the other end of said rod exteriorly of said socket adapted for manipulating said operative components longitudinally relative to said socket, beyond said entry, to said elevated position and, then, for rotating said rod in one direction from a first to a second position to locate said first and second members angularly relative to their position within said socket for receipt thereover of a fitting at a corner of said container whereby said first member enters through an opening into the interior of said fitting, and finally in an opposite direction to return said rod to said first position, said operative components further including a lug extending radially from said rod in position for coupling said second member and rod, a recess formed in a surface of said second member into which said lug extends whereby said second member follows directly the rotation of said rod in one direction, only, means for limiting rotation of said rod in said one direction to less than a full rotation and means for locking said handle to said deck when said operative components are in said retracted position and in said extended position when said rod is in said first position.

26. The combination of a deck and a twistlock for securing a container received on said deck for support, said deck including an opening and said twistlock including a socket said socket having an upper rim providing an entry opening to a cavity, said socket being mounted in said deck opening in a position that said upper rim of said socket locates at an upper surface of said deck and a plurality of operative components adapted for longitudinal movement to an elevated position from a retracted position within said cavity, said plurality of operative components including at least a first member, a second member, a rod supporting said first member in fixed relation at one end, and means carried by said rod for supporting said second member in a stacked position juxtaposed to said first member, a handle mounted at the other end of said rod exteriorly of said socket adapted for manipulating said operative components longitudinally relative to said socket, beyond said entry, to said elevated position and, then, for rotating said rod in one direction from a first to a second position to locate said first and second members angularly relative to their position within said socket for receipt thereover of a fitting at a corner of said container whereby said first member enters through an opening into the interior of said fitting, and finally in an opposite direction to return said rod to said first position, said support means also coupling said second member and rod whereby said second member follows directly the rotation of said rod in said one direction, only, said second member including a skirt extending axially of said rod thereby to substantially enclose said support means for protection, means for limiting rotation of said rod in said one direction to less than a full rotation, and means for locking said handle to said deck when said operative components are in said retracted position and in said extended position when said rod is in said first position.

* * * * *